United States Patent Office 3,033,829
Patented May 8, 1962

3,033,829
N-VINYL-5-PHENYL-2-OXAZOLIDINONE COMPOUNDS AND POLYMERS
William W. Bakke, Midland, Mich., assignor to The Dow Chemical Company, Midland, Mich., a corporation of Delaware
No Drawing. Filed Feb. 6, 1958, Ser. No. 713,567
6 Claims. (Cl. 260—77.5)

The present invention lies in the general field of organic chemistry and has particular reference to N-vinyl-5-phenyl-2-oxazolidinone, a new and useful monoethylenically unsaturated monomeric compound, and to various derivatives thereof, particularly polymeric and resinous products that have great utility and provide for many benefits and advantages in numerous applications.

One basic object of the invention is to provide, as new compositions of matter, N-vinyl-5-phenyl-2-oxazolidinone compounds that contain the characterizing group:

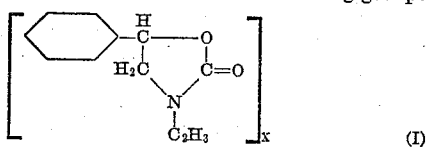

wherein $x$ has a numerical value of at least 1.

A specific object is to provide monomeric N-vinyl-5-phenyl-2-oxazolidinone, hereinafter more simply and conveniently referred to as VO–P.

A further object of considerable importance is to provide polymeric products, including copolymers with other monoethylenically unsaturated monomeric materials, that are derived from VO–P.

Yet another significant object is to provide homopolymeric poly-N-vinyl-5-phenyl-2-oxazolidinone which, for convenience and simplicity, is hereinafter referred to as PVO–P.

According to the present invention, the new monomeric compound which possibilitates the achievement of the above indicated and corollary objects (including the formation of new polymeric products) is of the general structure:

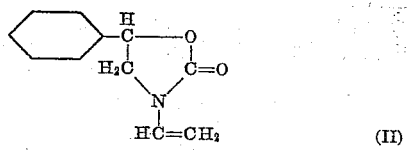

Monomeric VO–P is generally a white, crystalline solid which ordinarily melts, under normal atmospheric pressure, at 79.5–80.5° C. The monomer is soluble in such solvents as dioxane, acetone, chloroform, toluene and the like. It is generally insoluble in water, lower alkyl alcohols such as methanol, ethanol and propanol and in such solvents as Skelly Solvent (77–115° C.). Upon infrared analysis, the monomeric compound exhibits the characteristic absorption bands that are obtained when N-vinyl groups and

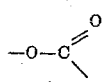

structural formations are present.

The monomeric compound reacts with solutions of bromine and chloroform, as evidenced by rapid discoloration of the halogen solution due to the bromination of the vinyl group in the monomer. Diluent solutions of potassium permanganate and the like reagents rapidly oxidize the vinyl group of the monomer.

Monomeric VO–P may advantageously be prepared involving the transvinylation of 5-phenyl-2-oxazolidinone with an ethyl or other alkyl vinyl ether under the influence of certain catalysts, such as mercuric acetate, mercuric benzoate, zinc acetate and vinyl mercuric acetate and the like as well as mixtures thereof. The compound 5-phenyl-2-oxazolidinone may be prepared from styrene oxide using urea under the influence of heat. In the transvinylation reaction the amount of catalyst required is generally less than 5 or 10 percent by weight, based on the weight of the reactant. Frequently only 1 percent or less of the catalyst may be found necessary. Usually, relatively greater quantities of a catalyst must be employed when the reaction is performed by batch-wise techniques instead of according to continuous processing arrangements.

It is suitable for the transvinylation reaction to be conducted in a solvent vehicle that is free from substituent hydroxy groups (such as dioxane, dimethylformamide, and the dimethyl ethers of di-, tri-, or tetraethylene glycol or the like) and for the reaction mass to be maintained under an atmosphere of an inert gas, such as nitrogen, during the course of the reaction. The reaction may generally be performed at temperatures from about 110 to 170° C., preferably between about 140 and 160° C. The reaction will occur at any desired pressure though, when it is conducted in autoclaves and the like apparatus—especially when solvent vehicles are employed, it is most convenient to accomplish the reaction under autogenous pressures. Ordinarily, good conversions and yields of desired product from the converted starting materials can be realized according to the transvinylation method within reaction periods of 24 hours or less. The desired monomeric VO–P, which is a high boiling material, can be easily recovered from the reaction mass using solvent extraction and precipitation techniques.

Monomeric VO–P will undergo polymerization in mass (which is oftentimes referred to as "bulk" polymerization) as well as polymerization, at practically any level of concentration, in solution or in emulsion or other dispersion in liquids with which the monomer being polymerized is soluble or insoluble, as the case may be, according to the particular technique involved. It is ordinarily beneficial for the polymerization to be conducted at a temperature between about 50 and 100° C., although this may vary with the particular catalysts used and the type of reaction being conducted. Suitable catalysts or initiators for polymerization of the monomeric VO–P include the azo catalysts, such as azobisisobutyronitrile; peroxygen catalysts, such as hydrogen peroxide, benzoyl peroxide, potassium persulfate and the like; and irradiation under the influence of high energy fields. The latter catalyzation may include the various actinic radiations, including such diverse forms of catalysis as ultraviolet, X-ray and gamma radiations, as well as radiations from radioactive materials and high energy electron beam generators from linear accelerators, resonant transformers and the like. Copolymers of VO–P with other N-vinyl-2-oxazolidinone monomers, including N-vinyl-2-oxazolidinone and alkyl ring-substituted N-vinyl-oxazolidinone (such as N-vinyl-5-methyl-2-oxazolidinone, N-vinyl-5-ethyl-2-oxazolidinone, etc.), as well as with other monomeric substances, including such monoethylenically unsaturated monomers as styrene, vinyl toluene, acrylonitrile, vinyl chloride, vinylidene chloride, methyl acrylate, ethyl acrylate, methyl methacrylate and other monomeric acrylate and methacrylate compounds, vinyl acetate, vinyl propionate and the like ethenoids (generally characterizable in containing a $CH_2=C<$ grouping), may be prepared in ways analogous to those described in the foregoing, including suspension and emulsion polymerization techniques Besides those mentioned in the foregoing, other monomers that may suitably be employed for the preparation of copolymerized VO–P products include those that have been disclosed in United States Letters Patent No. 2,818,362.

When copolymers are prepared, it is frequently desirable for the monomeric VO–P to constitute at least about 10 percent by weight of the mixture of copolymerizable materials, e.g., from 10 to 90 or 95 or even as high as 99 percent by weight of such mixture.

PVO–P may advantageously be prepared as a high polymer having a molecular weight, for example, in the range from 5 or 10 to 50 or 100 thousand and higher (as determinable from Fikentscher K-values of about 5–10 or more to as high as 75–100 or so) and a structural arrangement that may be depicted in the following way:

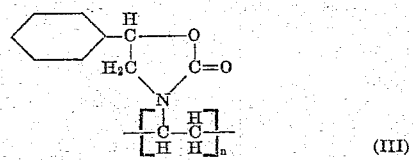

(III)

wherein $n$ is a plural integer, preferably one whose numerical value is greater than 10–50 and which may be as large as 2000–5000 or more. Of course, lower molecular weight polymers can also be made. Surprisingly enough, in view of the character of unsubstituted poly-N-vinyl-2-oxazolidinone (disclosed in the referred to U.S. patent) PVO–P is not hygroscopic. It is usually obtained as a light tan to white colored, free-flowing powder that is generally of a non-crystalline nature, as indicated by X-ray analysis. The homopolymer generally fuses at an elevated temperature of about 238–248° C. and definitely melts at about 246° C.; remaining in a molten condition until heated to its temperature of decomposition, which begins ordinarily at about 300° C. When the homopolymer is burned, it ordinarily leaves a sponge-like residue which tends to indicate the evolution of carbon dioxide during thermal decomposition or combustion. Infrared analysis of the polymer produces spectra conforming to an expectable pattern.

PVO–P in powder form has a density of about $$1.91 \left( d\frac{20}{4} \right)$$

grams per cubic centimeter (as compared to a theoretical density of about 2.06 grams per cubic centimeter). The homopolymer PVO–P is insoluble in water, diethyl ether, and acetone but is slightly soluble in such solvents as trichloromethane.

PVO–P can generally be molded at temperatures between about 150 and 200° C. to produce clear, hard and brittle, glass-like structures. The polymer exhibits good adhesiveness to siliceous materials, such as glass and the like and may advantageously be employed for purposes as coating glass or as a size for resin finish for glass fibers. In addition, the homopolymer has excellent affinity for many of a wide variety of dyestuffs. Thus, PVO–P can be utilized with great benefit as a dye-assisting adjuvant or dye-receptor for synthetic textile fibers and other shaped articles of normally difficult-to-dye synthetic polymers. In this capacity, PVO–P may be utilized with exceptional advantage when incorporated in fiber-forming compositions (and filamentary shaped articles produced therefrom) of the various acrylonitrile polymers, particularly polyacrylonitrile.

The invention is further illustrated in and by the following examples wherein, unless otherwise indicated, all parts and percentages are to be taken by weight.

*Example 1.—Preparation of VO–P*

A mixture consisting of about 81.5 grams (0.5 mole) of 5-phenyl-2-oxazolidinone, 108 grams (1.5 moles) of ethyl vinyl ether, 100 grams of dry dioxane and 3 grams (0.009 mole) of phenyl mercuric acetate was placed in a 1.5 liter rocking autoclave and heated to 154° C. for 24 hours. The reaction mixture was then allowed to cool to room temperature within an 8-hour period. The reaction product was then heated at 145° C. under a vacuum of 1 mm. absolute mercury pressure to remove low boiling materials. The residue was placed in diethyl ether whereupon a white solid precipitated. The precipitate was filtered and dried. Upon analysis, it was found to contain about 52 grams of VO–P. The yield of monomer, based on converted 5-phenyl-2-oxazolidinone, was about 55 percent. The product was purified by recrystallization from an acetone-water mixture. The physical properties and characteristics of the VO–P were found to be as described in the foregoing specification.

*Example 2.—Polymerization of VO–P*

About 2.0 grams of VO–P (81 percent pure), obtained as described in the first example, was heated in a beaker with a small amount of α,α'-azobisisobutyronitrile to a temperature of about 90° C., whereupon it polymerized to a brittle, slightly yellow-colored solid having a K-value of about 24.7 and characteristics as described in the foregoing specification.

Similar homopolymeric products can be obtained by polymerizing the monomer in solution in such solvents as dioxane or by using emulsion polymerization techniques. Likewise, copolymers of VO–P with any of the monomers mentioned in the foregoing specification may also be prepared in an analogous manner, using from 10 to 99 percent of the monomeric VO–P in the copolymerizable mixture and conventional quantities of a free-radical generating polymerization catalyst for the purpose.

*Example 3.—Uses of PVO–P*

A 10 percent by weight dispersion in chloroform of PVO–P having a K-value of about 25 is cast on a glass plate and placed in an oven at 100° C. to remove the solvent. A hard clear colorless protective film is thereby formed on the glass. The resulting film is extremely difficult to remove from the glass plate.

Solid PVO–P is compression molded for one minute at about 150° C. under an applied pressure of 600–700 pounds per square inch. A clear transparent brittle sheet results in having a density of about 1.9 grams per cubic centimeter.

About 10 parts of PVO–P (K–24.7) is blended with about 90 parts of fiber-forming polyacrylonitrile and prepared into a spinning composition using a 60 percent aqueous zinc chloride vehicle containing about 10 percent of total polymer solids dispersed therein. Prior to the blending, the PVO–P is reduced by mechanical comminution to a finely divided form to facilitate its dispersal in the spinning composition. PVO–P-containing polyacrylonitrile fibers are prepared by extruding the spinning composition through a spinnerette into a coagulating bath in a known manner using about 42 percent aqueous zinc chloride as the coagulant. The fibers, after coagulation are washed and oriented by stretching, prior to being dried, in order to finally obtain about a 3 denier filamentous product. The PVO–P-containing fibers are found to have excellent dye-receptivity for any of a wide variety of dyestuffs, including sulfur-vat dyes; vat dyes; basic dyes; direct dyes; natural premetalized dyes; and naphthol dyes. Specifically, the fibers readily accept such a dyestuff as Calcodur Pink 2BL (C.I. 353) to deep and level shades of coloration.

What is claimed is:

1. N-vinyl-5-phenyl-2-oxazolidinone.

2. An addition polymer of N-vinyl-5-phenyl-2-oxazolidinone.

3. The homopolymer of N-vinyl-5-phenyl-2-oxazolidinone.

4. Poly-N-vinyl-5-phenyl-2-oxazolidinone characterized in being a high polymer and having a molecular weight of at least about 10,000.

5. A composition comprising a copolymer of material polymerized proportions of (a) N-vinyl-5-phenyl-2-oxazolidinone and (b) a monomeric compound which is different from N-vinyl-5-phenyl-2-oxazolidinone, is copolymerizable therewith and which contains a CH$_2$=C< grouping.

6. A composition as in claim 5, wherein the compound of (b) is a vinyl compound.

References Cited in the file of this patent

UNITED STATES PATENTS

| | | |
|---|---|---|
| 2,399,118 | Homeyer | Apr. 23, 1946 |
| 2,786,043 | Schuller et al. | Mar. 19, 1957 |
| 2,818,362 | Drechsel | Dec. 31, 1957 |
| 2,818,399 | Drechsel | Dec. 31, 1957 |
| 2,826,587 | Trask et al. | Mar. 11, 1958 |